United States Patent
Kelso et al.

(10) Patent No.: US 8,972,966 B2
(45) Date of Patent: Mar. 3, 2015

(54) UPDATING FIRMWARE IN A HYBRID COMPUTING ENVIRONMENT

(75) Inventors: Scott E. Kelso, Cary, NC (US); Jian Li, Chapel Hill, NC (US); Steven R. Perrin, Raleigh, NC (US); Matthew P. Roper, Cary, NC (US); Bradley P. Strazisar, Cary, NC (US); Jianbang Zhang, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 273 days.

(21) Appl. No.: 13/343,845

(22) Filed: Jan. 5, 2012

(65) Prior Publication Data

US 2013/0179870 A1 Jul. 11, 2013

(51) Int. Cl.
| | |
|---|---|
| G06F 15/16 | (2006.01) |
| G06F 3/00 | (2006.01) |
| G06F 15/00 | (2006.01) |
| G06F 11/00 | (2006.01) |
| G06F 9/44 | (2006.01) |
| G06F 9/445 | (2006.01) |
| G06F 7/04 | (2006.01) |
| G06F 12/14 | (2006.01) |

(52) U.S. Cl.
USPC ........... 717/169; 709/219; 710/16; 712/1; 712/31; 714/15; 715/760; 715/764; 717/120; 717/168; 717/170; 717/173; 717/174; 726/16

(58) Field of Classification Search
CPC ....... G06F 9/441; G06F 9/45533; G06F 8/60; G06F 8/61; G06F 8/65; G06F 11/20; G06F 11/22; G06F 11/2294; G06F 11/2736; G06F 11/32; G06F 21/12
See application file for complete search history.

(56) References Cited

U.S. PATENT DOCUMENTS

| | | | |
|---|---|---|---|
| 7,146,640 B2 * | 12/2006 | Goodman et al. | 717/120 |
| 7,480,907 B1 * | 1/2009 | Marolia et al. | 717/174 |
| 8,601,170 B1 * | 12/2013 | Marr et al. | 717/168 |
| 8,612,740 B2 * | 12/2013 | Lee | 715/764 |
| 2006/0036832 A1 * | 2/2006 | Makiyama | 712/1 |
| 2007/0044148 A1 * | 2/2007 | Goodman et al. | 726/16 |
| 2007/0169106 A1 * | 7/2007 | Douglas et al. | 717/173 |
| 2008/0028046 A1 * | 1/2008 | Ushiki | 709/219 |
| 2008/0244553 A1 * | 10/2008 | Cromer et al. | 717/168 |
| 2009/0241103 A1 * | 9/2009 | Pennisi et al. | 717/173 |
| 2009/0249120 A1 * | 10/2009 | Yao et al. | 714/15 |
| 2010/0153948 A1 * | 6/2010 | Schreiber et al. | 715/760 |

(Continued)

FOREIGN PATENT DOCUMENTS

| | | |
|---|---|---|
| JP | 2005-174232 A1 | 6/2005 |
| JP | 2006-127040 A1 | 5/2006 |

(Continued)

*Primary Examiner* — Don Wong
*Assistant Examiner* — Anibal Rivera
(74) *Attorney, Agent, or Firm* — Ference & Associates

(57) ABSTRACT

Systems, methods and products directed toward facilitating firmware updates in a hybrid computing environment. One aspect includes providing a primary operating environment and a secondary operating environment in an information handling device; downloading one or more firmware update packages appropriate for the secondary operating environment to the primary operating environment; and executing a firmware update tool from the primary operating environment, the firmware update tool being configured to install the one or more firmware update packages on the secondary operating environment. Other embodiments are described herein.

20 Claims, 4 Drawing Sheets

(56) References Cited

U.S. PATENT DOCUMENTS

| | | | |
|---|---|---|---|
| 2010/0175062 A1* | 7/2010 | Kim | 717/173 |
| 2010/0211769 A1* | 8/2010 | Shankar et al. | 717/174 |
| 2010/0306501 A1* | 12/2010 | Chang et al. | 712/31 |
| 2011/0035741 A1* | 2/2011 | Thiyagarajan | 717/170 |
| 2011/0119664 A1* | 5/2011 | Kimura et al. | 717/173 |
| 2011/0258296 A1* | 10/2011 | Garrison Stuber et al. | 709/219 |
| 2012/0084767 A1* | 4/2012 | Ishimoto | 717/173 |
| 2012/0151100 A1* | 6/2012 | Roche et al. | 710/16 |
| 2013/0111457 A1* | 5/2013 | Culter | 717/171 |

FOREIGN PATENT DOCUMENTS

| | | |
|---|---|---|
| JP | 2007-334911 A1 | 12/2007 |
| JP | 2011-034130 A1 | 2/2011 |
| WO | 2010055073 A1 | 5/2010 |

* cited by examiner

UPDATING FIRMWARE IN A HYBRID COMPUTING ENVIRONMENT

BACKGROUND

Two major information handling device operating environments are the conventional computing device (for example, personal or laptop computer) ecosystem and the mobile device (for example, smartphone or tablet computing device) ecosystem. The conventional computing device ecosystem is generally comprised of a personal or laptop computer form factor housing a Win-Tel platform, for example, a platform comprised of an Intel x86 compatible processor capable of running a Microsoft WINDOWS operating system, such as WINDOWS 7 operating system. WINDOWS 7 is a registered trademark of Microsoft Corporation in the United States and/or other countries.

The mobile device ecosystem is generally configured to run on lower powered processors and lighter weight operating systems designed specifically for smaller devices (e.g., devices capable of "hand-held" operation). A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. ANDROID is a registered trademark of Google Incorporated in the United States and/or other countries. SNAPDRAGON BY QUALCOMM is a registered trademark of Qualcomm Incorporated in the United States and/or other countries.

Conventional computing device and mobile device operating environments each have their own set of advantages. For example, advantages for mobile devices operating environments include mobility, size, and increased energy efficiency, while primary reasons for preferring conventional computing devices include increased processing power and traditional input devices.

BRIEF SUMMARY

In summary, one aspect provides an information handling device comprising: one or more processors; a memory in operative connection with the one or more processors; and wherein, responsive to execution of program instructions accessible to the one or more processors, the one or more processors are configured to: provide a primary operating environment and a secondary operating environment; download one or more firmware update packages appropriate for the secondary operating environment to the primary operating environment; and execute a firmware update tool on the primary operating environment, the firmware update tool being configured to install the one or more firmware update packages on the secondary operating environment.

Another aspect provides a method comprising: providing a primary operating environment and a secondary operating environment in an information handling device; downloading one or more firmware update packages appropriate for the secondary operating environment to the primary operating environment; and executing a firmware update tool from the primary operating environment, the firmware update tool being configured to install the one or more firmware update packages on the secondary operating environment.

A further aspect provides a program product comprising: a storage medium having program code embodied therewith, the program code comprising: program code configured to provide a primary operating environment and a secondary operating environment in an information handling device; program code configured to download one or more firmware update packages appropriate for the secondary operating environment to the primary operating environment; and program code configured to execute a firmware update tool on the primary operating environment, the firmware update tool being configured to install the one or more firmware update packages on the secondary operating environment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments provide for a hybrid computing system comprising a primary environment (PE) (for example, a conventional computing device platform, such as a Win-Tel platform) and a secondary environment (SE) (for example, a mobile device platform, such as an ANDROID platform) in a single computing system. The hybrid computer system includes various features, as described further herein. In and among other features, embodiment support updating firmware in a hybrid computing system.

Figure 1:
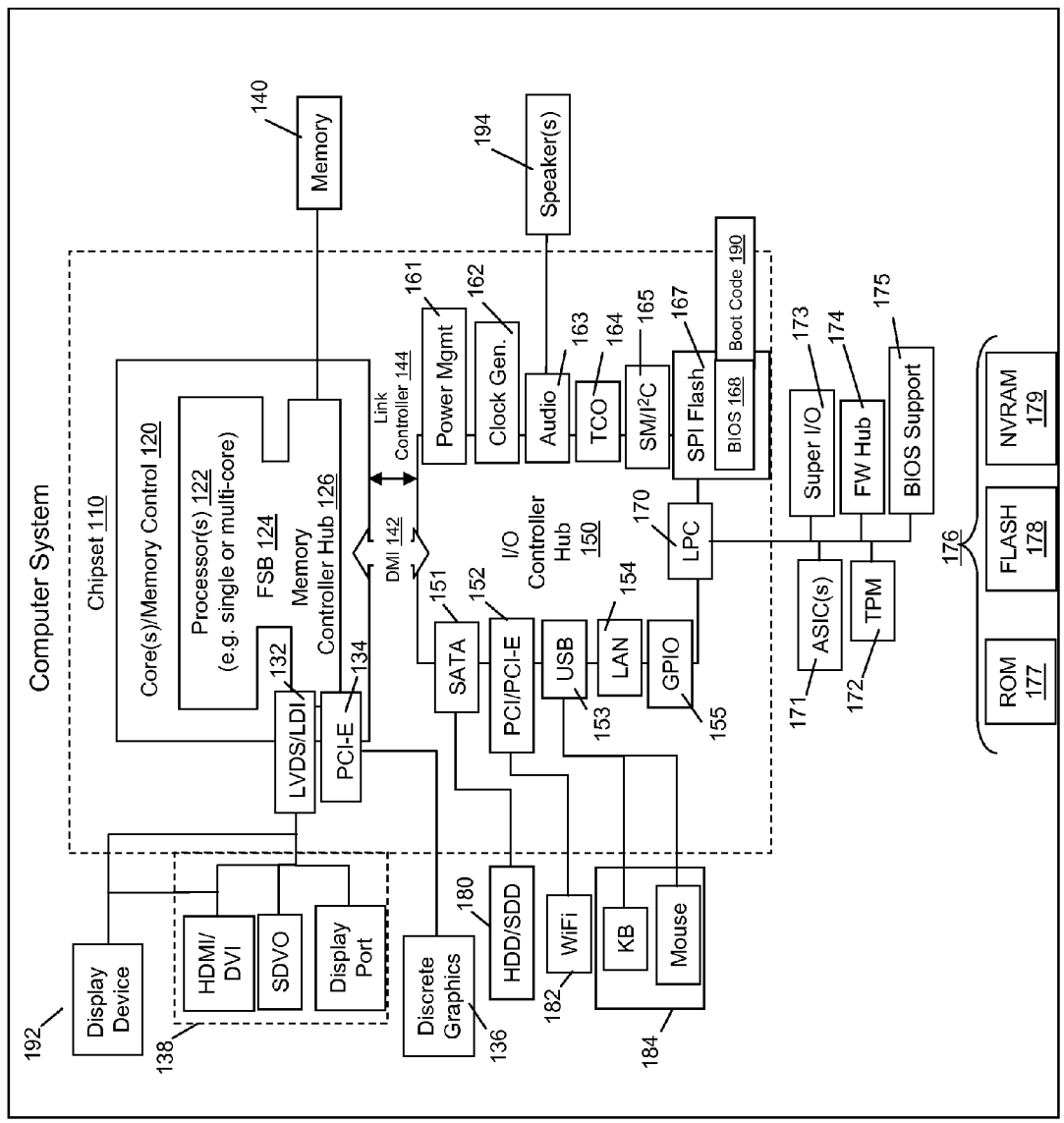
FIG. 1 illustrates an example circuitry of an information handling device system.

While various other circuits, circuitry or components may be utilized, FIG. 1 depicts a block diagram of one example of Win-Tel type information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, et cetera). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCIe interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 167, which can include BIOS 168 and boot code 190. The I/O hub controller 150 may include gigabit Ethernet support.

The system, upon power on, may be configured to execute boot code 190 for the BIOS 168, as stored within the SPI Flash 167, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
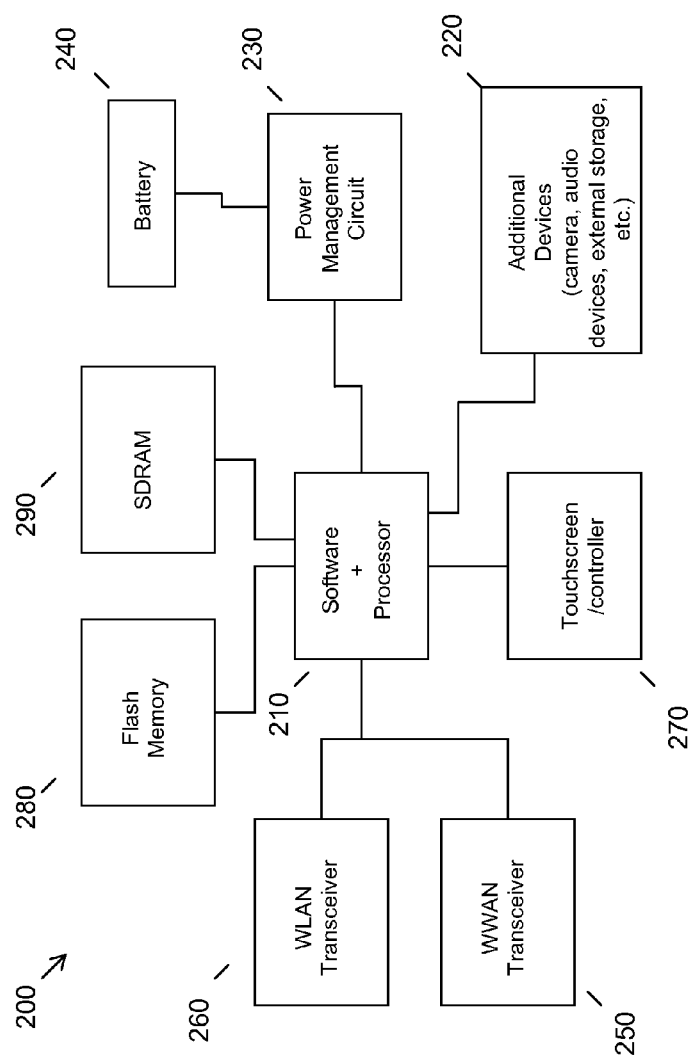
FIG. 2 illustrates another example circuitry of an information handling device system.

Referring to FIG. 2, with regard to smart phone and/or tablet circuitry 200, an example includes an ARM based system design, with software and processor(s) combined in a single chip 210. Internal busses and the like depend on different vendors, but essentially all the peripheral devices (220) may attach to a single chip 210. In contrast to the circuitry illustrated in FIG. 2, the tablet circuitry 200 may combine the processor, memory control, and I/O controller hub all into a single chip 210, commonly referred to a "system on a chip" (SOC). Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, may be used to supply BIOS like functionality and DRAM memory.

ARM based systems 200 typically include one or more wireless transceivers, including, but not limited to, WWAN 260 and WLAN 250 transceivers for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

As described herein, embodiments combine components of FIG. 1 and FIG. 2 into a hybrid system. While various embodiments may take a variety of hybrid forms, FIG. 3 illustrates one example hybrid environment configured to support the tuning of a multi-band antenna through a standard system bus slot as provided according to embodiments described herein.

Figure 3:
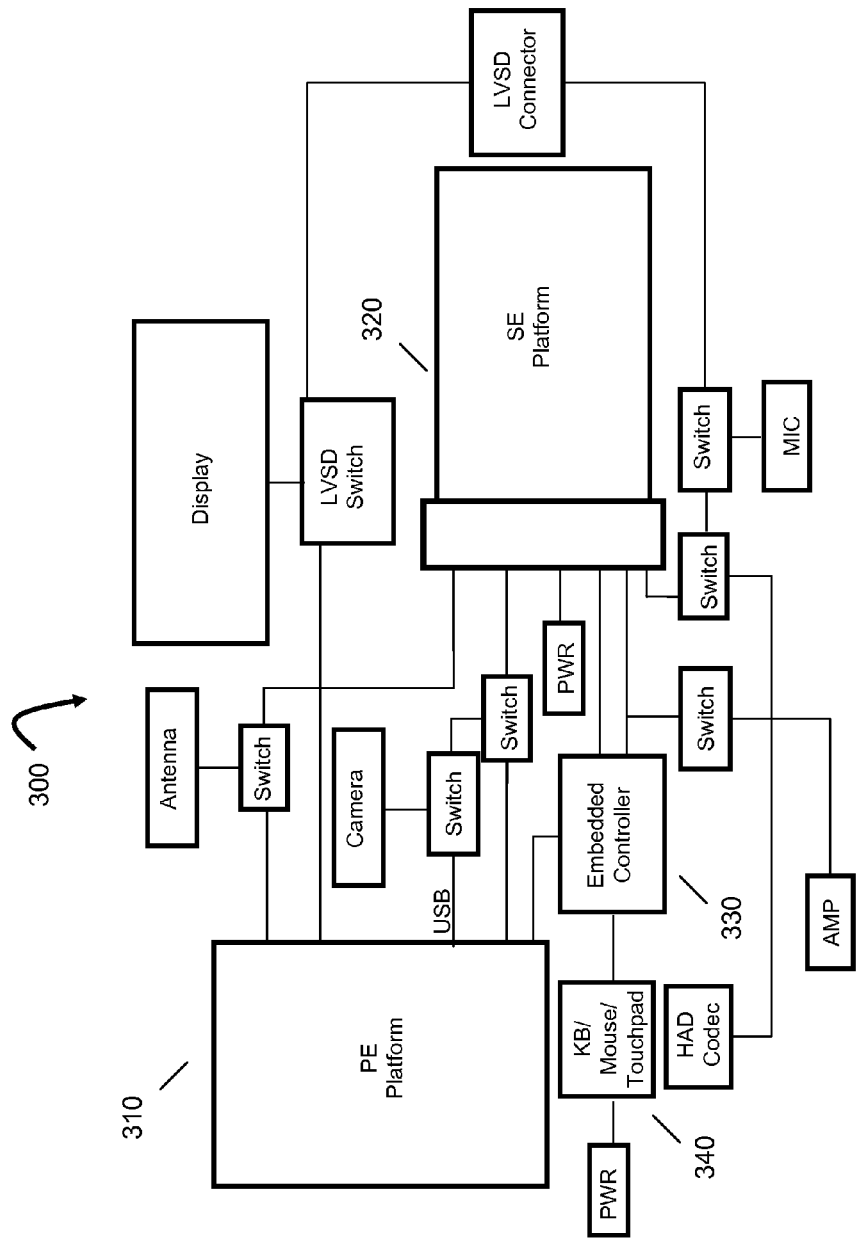
FIG. 3 illustrates an example hybrid information handling device environment.

FIG. 3 provides an illustration of an example embodiment of a hybrid information handling device 300 ("device"). The device 300 has at least two environments or states: a primary environment (PE) and a secondary environment (SE), supported by two platforms, 310 and 320, respectively. Thus, device 300 may include a PE platform 310 similar to that described in FIG. 1, and a SE platform 320 such as that described in FIG. 2. For example, an embodiment provides a PE in which a user experiences a WINDOWS operating environment or state, and a SE in which a user experiences an ANDROID operating environment or state. In a PE, the device 300 may thus operate according to a WINDOWS operating system. In a SE, the device 300 may operate according to an ANDROID operating system. According to an embodiment, a user may switch between these two states.

An embodiment provides that the hybrid computing device may be comprised of an embedded controller 330 that, inter alia, remembers the environment, SE or PE, that was previously active and may inform one environment (e.g., SE) that the other environment (e.g., PE) has changed state. The device 300 may include a display and input interfaces (for example, keyboard, mouse, touch interface, et cetera). Switching electronics (switches in FIG. 3) may be used to permit certain components to be used by either the PE or SE platforms 310, to be used by either the PE or SE platforms 310, 320, depending on which is the actual operating environment chosen by the user.

Communications between PE platform 310 and the SE platform 320 may take place various levels. Control of machine-state, security and other related functions may be provided by an embedded controller 320 of the device 300. Communication links may use protocols like I2C or LPC. Higher bandwidth communications, such as used to move large amounts of data, for example video files, may use methods like USB, PCI express or Ethernet.

When the device 300 is in the SE mode or state, the device 300 operates as an independent tablet computer. As such, the SE platform 320 and the lightweight/tablet operating system executed therewith, such as an ANDROID operating system, control the operation of the device 300, including the display, peripherals such as a camera, microphone, speaker, shared wireless antenna, accelerometer, SD card, other similar peripheral devices, and software applications.

The device 300 utilizes the PE platform 310 when the user selects such an operational state, and this operational state may be set as a default or an initial state. When in the PE state, the device 300 is controlled by a PE platform 310, including for example a WINDOWS operating system. Essentially, the device 300 becomes a conventional laptop computer when PE platform 310 controls operation. As such, the SE platform 320 does not control device 300, peripherals, et cetera, when the device 300 is in the PE state, though an ANDROID operating system of SE platform 320 may be running in the PE state, as further described herein.

In such a hybrid environment, there are thus essentially two computing systems within one device 700, that is a primary system (running in the PE), and a secondary system (running in the SE). These systems may share access to various hardware, software, peripheral devices, internal components, et cetera, depending on the state (PE or SE). Each system is capable of operating independently.

According to an embodiment, a user may switch between the PE and SE environments, for example, through one or more hardware or software switches that switch hardware from being controlled or physically attached to one environment to being controlled or physically attached to a second environment. Switched hardware may include, but is not limited to, a display, microphone, mouse, keyboard, touchpad, microphone, storage devices, and USB devices. Embodiments provide that when an environment (e.g., SE) is in control of the hybrid device, the other environment (e.g., PE) may be placed in a standby mode. As such, each environment may operate independently of the power state of the other environment.

Additional embodiments provide for switching responsive to one or more user actions, such as opening one or more applications, accessing a certain file type, connecting or disconnecting a device (e.g., camera), or responsive to one or more device states, such as a low battery state. A non-limiting example provides that the hybrid device may switch from the PE state to the SE state responsive to a user opening certain media files (e.g., a movie file), such that the user may execute the file in a lower-power environment.

Embodiments may be implemented in one or more information handling devices configured appropriately to execute program instructions consistent with the functionality of the embodiments as described herein. In this regard, FIGS. 1-3 illustrate non-limiting examples of such devices and components thereof. While mobile information handling devices such as tablet computers, laptop computers, and smart phones have been specifically mentioned as examples herein, embodiments may be implemented using other systems or devices as appropriate.

In general, information handling devices may typically contain boot code, an operating system, applications, and data stored in non-volatile storage. For more complex devices, it may be desired or even necessary to provide methods for updating these and other device code elements, which may be comprised of software or some combination of hardware and software. For mobile devices such as smartphones and tablet computing devices, such device code elements may be generally referred to as "firmware" and the act of replacing or modifying it as "updating the firmware." The process of updating firmware is a necessary and common action because developers are continually working to improve, maintain, and fix consumer devices, even after they have been released in the marketplace.

An exemplary firmware update method is over-the-air (OTA) using the Wi-Fi or cellular data services of a device to access the Internet and connect a device directly to servers that host firmware update packages. During this process, the server, the device, or both may determine if downloading and applying the firmware package is appropriate, for example, through the exchange of meta-data pertaining to the versions of firmware present on the device. If an appropriate firmware update is located, the device may download and install the update. However, each operating environment of a hybrid information handling device configured according to embodiments may not interact directly with a user in a manner that facilitates OTA firmware update processes.

A host-based firmware updating tool provides another exemplary firmware update method. In this method, a firmware update tool runs on a PC host, such as a WINDOWS or MACINTOSH system, which polls update servers through an Internet connection. MACINTOSH is a registered trademark of Apple Inc. If an appropriate update is found, the firmware update tool downloads it to the PC host. The next time the mobile device is attached to the host PC, the firmware update may be automatically pushed to the mobile device or installed responsive to a user request. Nonetheless, this method does not integrate well with tools for updating device drivers and applications that comprise the hybrid information handling device arranged according to embodiments, for example, the PE (WINDOWS) environment components. In addition, such processes may require a user to manage firmware updates for each operating environment as an independent device rather than as a combined whole.

Embodiments provide processes for updating firmware in a hybrid information handling device configured according to embodiments provided herein. According to embodiments, firmware may be updated in a SE of a hybrid information handling device operating in combination with a PE.

Figure 4:
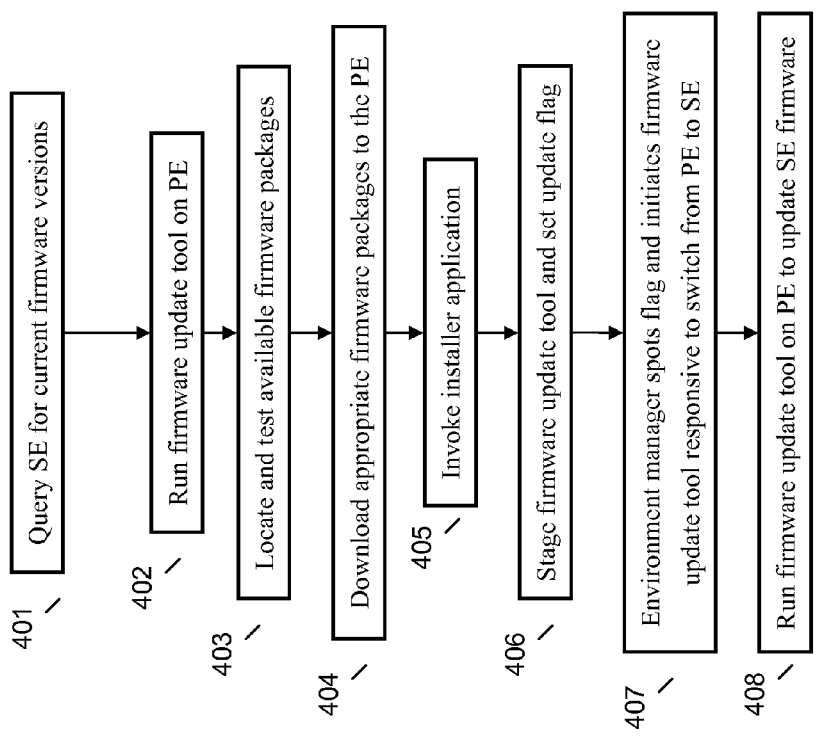
FIG. 4 provides an example firmware update process configured according to an embodiment.

Referring to FIG. 4, therein is provided an example firmware update process configured according to an embodiment. An environment switch manager may query the SE for current firmware versions and store it within the PE 401, such as in a file, in memory, in the registry, database structures, or some combination thereof. Firmware versions may be queried at various times, including, but not limited to, when the hybrid information device switches from the PE to the SE, system startup, resume from sleep, or at predetermined time intervals. A firmware update tool may run on the PE, for example, automatically or responsive to user request 402. The firmware update tool may locate and test available firmware update packages to determine if they are appropriate 403. Appropriate firmware update packages may be downloaded to the PE 404 and an installer application may thereafter be invoked 405. The installer application may operate, inter alia, to stage the firmware update tool and firmware image, set a flag indicating that updates are available for the environment switch manager, and subsequently exit 406.

Responsive to the next switch from the PE to the SE, the environment switch manager may spot the flag and initiate the previously-staged firmware update tool 407. The firmware tool update may run on the PE (e.g., in WINDOWS), and present a PE-based interface for facilitating the firmware updating process, which may operate to update the SE firmware 408.

According to embodiments, the firmware update tool may be in the form of the THINKVANTAGE System Updater (TVSU) tool, which may run automatically or responsive to request within a WINDOWS environment (e.g., the PE). THINKVANTAGE is a registered trademark of Lenovo. Other firmware update tools may be utilized according to embodiments, including, but not limited to, LANDESK and MICROSOFT WINDOWS installer. LANDESK is a registered trademark of LANDesk Software, Inc. Contrary to existing technology, the TVSU may operate to update multiple device code elements, including applications, firmware, drivers, and combinations thereof. Embodiments provide that the firmware updating process on the SE may be facilitated by a SE firmware update tool, for example, the GOOGLE "fastboot" application, which may operate to install the firmware image to the SE.

The hybrid information handling device provides a user with the functionality of two different systems in a single device. However, it is less efficient to perform multiple independent functions to use and update such a hybrid information handling device. Accordingly, embodiments provide for packaging a SE firmware update inside of a PE installer, such that the user may have a single interface for installing both SE and PE updates. In addition, firmware updates may be packaged using a standard installer (e.g., the WINDOWS installer) and delivered through a single tool (e.g., TVSU). Updates may then be packaged for an environment switch manager and SE firmware in a single package, wherein both may be installed with a single action.

Aspects of the PE may be managed according to embodiments to prevent interruption of an SE firmware update operation. For example, embodiments may be configured to prevent powering off or restarting of the SE and/or PE in the middle of a firmware update operation. This may be necessary because the PE may control the SE on/off state. Embodiments provide that the power states of the PE and the SE may not be entirely separate, for example, the power states may be comprised of one or more interlocks to prevent, inter alia, the PE from shutting off while the SE is being updated. According to embodiments, APIs present in the PE (e.g., WINDOWS APIs) may be utilized to ensure that the PE does not shutdown during a SE firmware update operation. A non-limiting example provides that the device battery level may be queried before an SE update proceeds such that if the battery life is below a certain level, the update may not be initiated. In another non-limiting example, an SE update may only proceed if a power adapter (e.g., AC power adapter) is connected to the system. Further embodiments provide that the SE firmware update tool may comprise a progress reporting function arranged to report progress of the SE firmware update. For example, progress may be provided for transferring the firmware image from the PE to the SE, installation progress of the firmware update on the SE, or some combination thereof.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
   one or more processors;
   one or more memories storing program instructions accessible by the one or more processors; and wherein, responsive to execution of program instructions accessible to the one or more processors, the one or more processors:

provide a primary user operating system environment and a secondary user operating system environment, wherein the primary user operating system environment and the secondary user operating system environment are supported by separate hardware platforms, the primary user operating system environment has a power state operating independently of a power state of the secondary user operating system environment;

download one or more firmware update packages appropriate for the secondary user operating system environment to the primary user operating system environment; and execute a firmware update tool from the primary user operating system environment, wherein the firmware update tool installs the one or more firmware update packages on the secondary user operating system environment; and further wherein the information handling device comprises a trigger to switch between the primary user operating system environment and the secondary user operating system environment.

2. The information handling device according to claim 1, wherein the firmware update tool is executed responsive to a trigger to switch from the primary user operating system environment to the secondary user operating system environment.

3. The information handling device according to claim 1, wherein the one or more processors query versions of one or more firmware applications resident on the secondary user operating system environment.

4. The information handling device according to claim 3, wherein the versions of the one or more firmware applications are stored in one or more registry files of the primary user operating system environment.

5. The information handling device according to claim 1, wherein one or more flags indicate that one or more firmware update packages are available.

6. The information handling device according to claim 1, further comprising a primary user operating system environment installer tool which stages the one or more firmware update packages.

7. The information handling device according to claim 6, wherein the primary user operating system environment installer tool is activated responsive to the downloading of one or more firmware update packages.

8. The information handling device according to claim 1, wherein the one or more firmware update packages are installed on the secondary user operating system environment responsive to one or more information handling device conditions.

9. The information handling device according to claim 8, wherein the one or more information handling device conditions comprise a power level of a battery being above a predetermined threshold.

10. The information handling device according to claim 1, wherein the one or more processors provide progress information of the one or more firmware update packages being installed on the secondary user operating system environment.

11. A method comprising:

providing, in a hybrid computing device, a primary user operating system environment and a secondary user operating system environment, wherein the primary user operating system environment and the secondary user operating system environment are supported by separate hardware platforms, the primary user operating system environment has a power state operating independently of a power state of the secondary user operating system environment;

downloading one or more firmware update packages appropriate for the secondary user operating system environment to the primary user operating system environment; and executing a firmware update tool from the primary user operating system environment, wherein the firmware update tool installs the one or more firmware update packages on the secondary user operating system environment; and further wherein the information handling device comprises a trigger to switch between the primary user operating system environment and the secondary user operating system environment.

12. The method according to claim 11, wherein the firmware update tool is executed responsive to a trigger to switch from the primary user operating system environment to the secondary user operating system environment.

13. The method according to claim 11, further comprising querying versions of one or more firmware applications resident on the secondary user operating system environment.

14. The method according to claim 13, wherein the versions of the one or more firmware applications are stored in one or more registry files of the primary user operating system environment.

15. The method according to claim 1, wherein one or more flags indicate that one or more firmware update packages are available.

16. The method according to claim 1, further comprising a primary user operating system environment installer tool which stages the one or more firmware update packages.

17. The method according to claim 11, wherein the one or more firmware update packages are installed on the secondary user operating system environment responsive to one or more device conditions.

18. The method according to claim 17, wherein the one or more device conditions comprise a power level of a battery being above a predetermined threshold.

19. The method according to claim 11, further comprising providing progress information for the one or more firmware update packages being installed on the secondary user operating system environment.

20. A program product comprising:

a non-signal storage medium having program code embodied therewith, the program code comprising:

program code that provides a primary user operating system environment and a secondary user operating system environment in an information handling device, wherein the primary user operating system environment and the secondary user operating system environment are supported by separate hardware platforms, the primary user operating system environment has a power state operating independently of a power state of the secondary user operating system environment;

program code that downloads one or more firmware update packages appropriate for the secondary user operating system environment to the primary user operating system environment; and program code that executes a firmware update tool from the primary user operating system environment, wherein the firmware update tool installs the one or more firmware update packages on the secondary user operating system environment; and wherein the information handling device comprises a trigger to switch between the primary user operating system environment and the secondary user operating system environment.

* * * * *